United States Patent [19]

Fujishiro et al.

[11] 4,373,378
[45] Feb. 15, 1983

[54] VIBRATION SENSOR FOR AN AUTOMOTIVE VEHICLE

[75] Inventors: Takeshi Fujishiro, Yokosuka; Kiyoshi Takeuchi, Yokohama; Toru Kita, Yokosuka, all of Japan

[73] Assignee: Nissan Motor Company, Limited, Yokohama, Japan

[21] Appl. No.: 202,271

[22] Filed: Oct. 30, 1980

[30] Foreign Application Priority Data

Nov. 6, 1979 [JP] Japan .................. 54-143736

[51] Int. Cl.³ .............................. G01L 23/22
[52] U.S. Cl. ........................ 73/35; 310/329; 73/651
[58] Field of Search ........... 73/35, 517 R, 651, 652; 310/329

[56] References Cited

U.S. PATENT DOCUMENTS 2,722,614 11/1955 Fryklund ............ 310/329 X
4,254,354 3/1981 Keem .................. 73/35 X

FOREIGN PATENT DOCUMENTS

741195 11/1943 Fed. Rep. of Germany .
2801969 7/1979 Fed. Rep. of Germany .
230524 3/1944 Switzerland .............. 310/329
1316811 5/1973 United Kingdom .
1548962 7/1979 United Kingdom .

Primary Examiner—James J. Gill
Attorney, Agent, or Firm—Thompson, Birch, Gauthier & Samuels

[57] ABSTRACT

A vibration sensor for an automotive vehicle having a multi-peak vibration characteristic of wider responsiveness and of a higher S/N ratio. The vibration sensor comprises a plurality of piezoelectric vibrators so arranged that the piezoelectric voltage signals from the vibrators are synthesized in reverse polarity between two elements having two adjacent resonant frequencies, when the element are deformed in the same direction. Therefore, the voltages are synthesized in the same polarity, when engine knocking frequency lies between two adjacent sensor resonant frequencies, because a vibrator is 180 degrees out of phase with another adjacent vibrator.

13 Claims, 22 Drawing Figures

KNOCKING FREQUENCY (KHz)

VIBRATION SENSOR FOR AN AUTOMOTIVE VEHICLE

BACKGROUND OF THE INVENTION

1. Field of the Invention

The present invention relates generally to a vibration sensor for an automotive vehicle which can detect mechanical vibration generated from an internal combustion engine, for example, such as knocking, and more specifically to a vibration sensor for an automotive vehicle having a multi-peak vibration characteristic of wider responsiveness and of higher S/N ratio.

2. Description of the Prior Art

Generally, if strong engine knocking continues for a long time while the internal combustion engine is operating, the knocking will exert an undesired influence on the engine in durability or performance. However, it has also been known that the best engine operating conditions with respect to engine torque characteristics and fuel consumption rate can be obtained when the engine operates with a weak knocking at relatively slow engine speeds.

Heretofore, various systems have been proposed which can detect engine knocking conditions and regulate the engine spark timing according to the knocking conditions to maintain a weak knocking state at all times to improve the engine torque characteristics and fuel consumption rate. This is because engine spark timing has a close relationship to engine knocking conditions.

In the system mentioned above, a vibration sensor is indispensable in order to detect the knocking conditions of an internal combustion engine and, therefore, there has already been proposed a vibration sensor for an automotive vehicle having a piezoelectric vibration element mounted therein in cantilever fashion. However, since a single vibration element with a relatively sharp response characteristic has conventionally been used for this vibration sensor, the problem has occurred that if knocking frequency deviates from the resonance frequency, it is impossible to detect knocking vibration sufficiently and correctly and the S/N ratio of the sensor drops sharply.

BRIEF SUMMARY OF THE INVENTION

With these problems in mind, therefore, it is the primary object of the present invention to provide a vibration sensor for an automotive vehicle which has a multi-peak response characteristic of wider responsiveness and of higher S/N ratio.

To achieve the above mentioned object, the vibration sensor of the present invention comprises a plurality of piezoelectric vibration elements so arranged that the piezoelectric voltage signals from the elements are synthesized in reverse polarity between two elements having adjacent resonant frequencies, when the elements are deformed in the same direction.

In other words, the piezoelectric vibration elements are so arranged to generate a piezoelectric voltage signal synthesized in the same polarity when an external knocking frequency lies between two adjacent resonant frequencies of the vibration elements.

This is because the present invention utilizes the principle of vibration characteristics such that the vibration phase of a vibrator with respect to the external force is switched from 0° to 180° (if the viscous damping coefficient is zero) the moment the external force frequency exceeds the vibrator resonant frequency.

BRIEF DESCRIPTION OF THE DRAWINGS

The features and advantages of the vibration sensor according to the present invention will be more clearly appreciated from the following description taken in conjunction with the accompanying drawings in which like reference numerals designate corresponding elements, and in which.

DETAILED DESCRIPTION OF THE PREFERRED EMBODIMENTS

Figure 1:
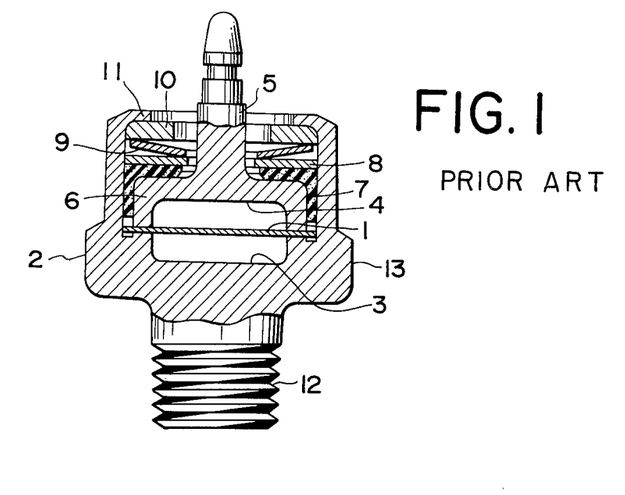
FIG. 1 is a vertical sectional view of a prior art vibration sensor.

To facilitate understanding the present invention, a brief reference will be made to a conventional vibration sensor for an automotive vehicle. Referring to FIG. 1, a thin, round diaphragm vibrator 1 is made of a piezoelectric element, both surfaces of which are coated by, for example, silver to form electrode surfaces.

The vibrator 1 is housed in a housing 2 having a concave portion 3, and is clamped by an electrode 5 having a flange 6 to form another concave portion 4. The vibrator 1 is excited by the housing 2 to form diaphragm vibration.

One of the electrode surfaces of the vibrator 1 is connected to the conductive housing 2; the other is connected to the conductive electrode 5.

To fix the diaphragm vibrator 1 under a constant clamping force, a dish-shaped spring 9 is placed between a spring sheet 8 and a retainer 10. The numeral 7 denotes an insulator. The retainer 10 is fixed by bending inward the cylindrical housing end to form a flange portion 11.

Since the diaphragm vibrator 1 is clamped by an elastic force of the dish-shaped spring 9 under almost constant pressure, it is possible to prevent the resonant frequency of the vibrator 1 from being varied according to the vibrator fixing pressure. In addition, the diameter of the concave portion 3 of the housing 2 is designed to be equal to that of the electrode 5, so that the vibrator supporting internal diameters of both parts coincide. In this embodiment, the supporting internal diameter is determined so that a resonant frequency of the vibrator 1 may range over usual engine knocking frequencies between 5 and 9 KHZ.

The vibration sensor thus constructed is fixed onto an engine body with an anchor bolt 12 integrally formed with the housing 2. In addition, the base portion 13 of the housing 2 is hexagonal in shape for easy grasping with conventional mechanics tools.

When the vibrator 1 begins to vibrate up and down with its periphery as the fulcrum according to vibration of an engine body, a difference in potential is generated between two electrode surfaces of the piezoelectric element in accordance with the deformation rate. Since one electrode surface is grounded through the housing 2, it is possible to transduce a mechanical vibration of the vibrator 1 (of the piezoelectric element) into a voltage signal between the electrode 5 and the body ground. Further, since the vibrator 1 is so designed to resonate within a knocking frequency range of an engine, it is possible to detect the vibration due to knocking both efficiently and accurately.

The voltage thus generated is then detected as a sensor output signal between the housing body (ground) and the conductive electrode (terminal) 5. In this case, since the resonant frequency of the vibrator unit 1 is set within a knocking frequency range of the engine (usually from 5 to 9 KHz, depending upon the engine type), only vibration frequencies within the knocking frequency range are detected as a sensor signal for engine knocking.

Figure 2:
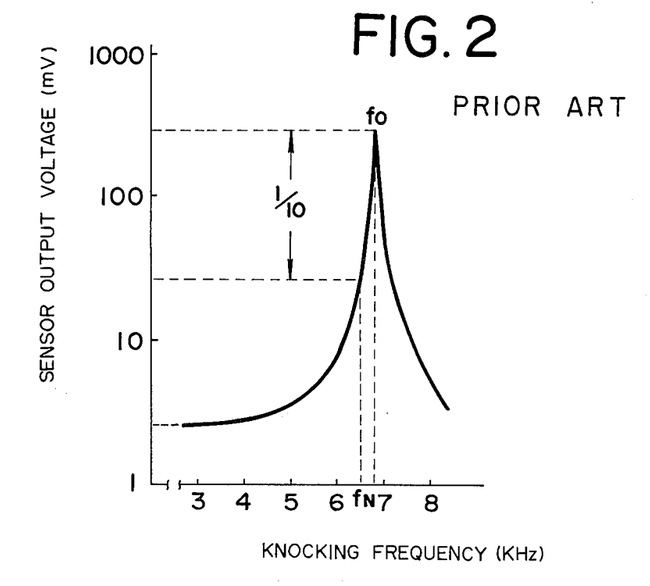
FIG. 2 is a response characteristic diagram of the prior art vibrator used with the sensor of FIG. 1.

With the knocking sensor explained hereinabove, however, since the response characteristic is relatively sharp, as shown in FIG. 2, if the knocking frequency deviates from the resonant frequency $f_0$, it is impossible to detect the knocking vibration effectively, resulting in another problem that S/N ratio of the vibration sensor is reduced markedly.

Figure 3:
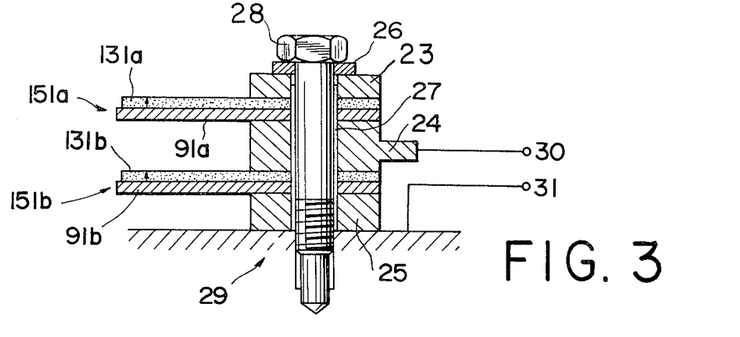
FIG. 3 is a vertical sectional view showing a first embodiment of a set of cantilever type vibrators arranged in parallel relation to each other according to the present invention.

In view of the above description, reference is now made to FIGS. 3 to 15, and more specifically to FIG. 3, wherein a first embodiment of the vibration sensor of the present invention is illustrated.

In FIG. 3, two vibrator units 151a and 151b comprising two piezoelectric elements 131a and 131b and metal plates 91a and 91b (the same structure as shown in FIG. 2) are fixed to an engine body 29 by a bolt 28 with a washer 26 and collars 23, 24 and 25 therebetween. In addition, a cylindrical insulating sleeve 27 is inserted into the center holes of the collars 23, 24 and 25.

The resonant frequencies of the two vibrator units 151a and 151b are designed to be different from each other, for example, 6.7 KHz and 6.3 KHz, respectively. In this embodiment, the piezoelectric elements 131a and 131b of the vibrator units 151a and 151b are arranged so that the dielectric polarization directions of the two elements are the same as shown by the arrow marks, and the piezoelectric voltage signals generated from the respective elements are synthesized and transmitted through a terminal 30 connected to the metal collar 24 and another terminal 31 connected to the engine body 29. That is to say, the upper surface electrode (not shown in FIG. 3) of the piezoelectric element 131a and the lower surface electrode (not shown) of the piezoelectric element 131b are connected through the collar 23, washer 26, bolt 28, engine body 29, collar 25, and metal plate 91b, and the lower surface electrode of the element 131a and the upper surface electrode of the element 131b are connected through the metal plate 19a and collar 24. Therefore, when the vibrator units 151a and 151b are deformed in the same direction, the piezoelectric voltage signals from the vibrator units are synthesized with each other in reverse polarity.

Next, a detailed description will be made concerning the vibrator response characteristics near resonant frequency.

Figure 4:
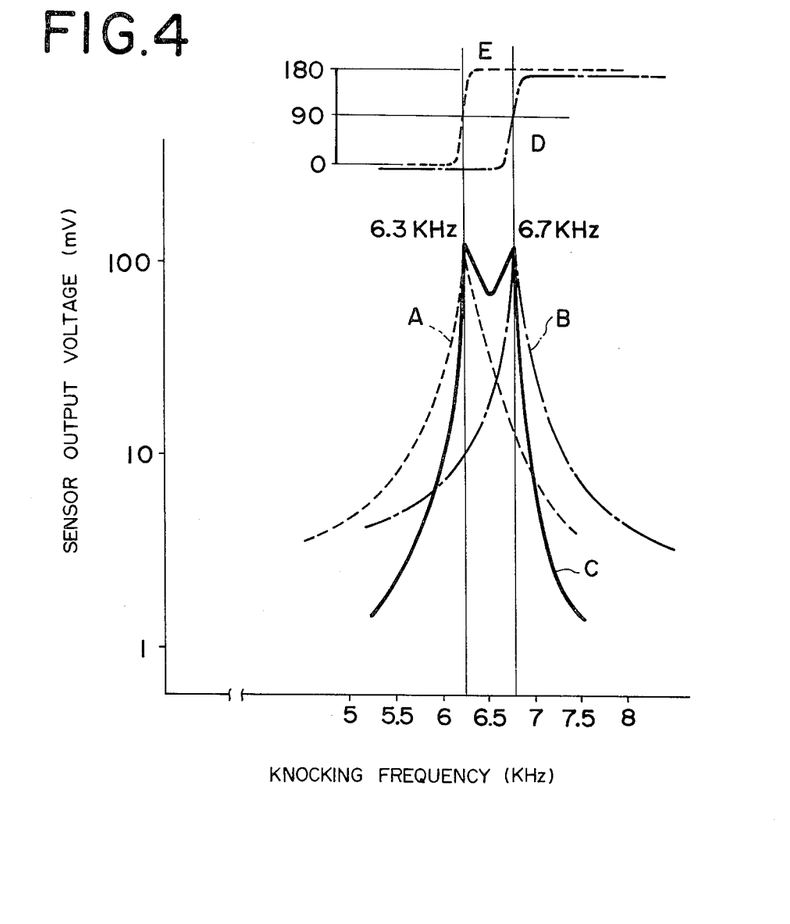
FIG. 4 is a response characteristic diagram of the vibrators of FIG. 3.

FIG. 4 shows an example vibration response characteristic with respect to external force frequency, in which the vibrator output voltage and vibrator phase (small figure on the upper side) are illustrated in the same figure. In this figure, the resonant frequency of the first vibrator unit 151a is set at 6.3 KHz and that of the second vibrator unit 151b is set at 6.7 KHz. As depicted in the upper graphical representation, if external force frequencies are less than the resonant frequency, the vibrator motion is in phase with the external force vibration; and if greater than the resonant frequency, the vibrator motion is 180 degrees out of phase with the external force vibration (if the viscous damping coefficient is zero). Therefore, in this example of FIG. 4, if the external force frequencies are less than 6.3 KHz or greater than 6.7 KHz, the vibrator motion A (6.3 KHz) is in phase with the vibrator motion B (6.7 KHz); if the external force frequencies are between 6.3 KHz and 6.7 KHz, the vibrator motion A is 180 degrees out of phase with the vibrator motion B.

However, since the first vibrator 151a (A in FIG. 4) and the second vibrator 151b (B in FIG. 4) are connected so as to be synthesized in reverse polarity when deformed in the same direction as described before, if the knocking frequencies are less than 6.3 KHz or greater than 6.7 KHz, both piezoelectric output voltage signals are cancelled out; if the knocking frequencies are between 6.3 and 6.7 KHz, both signals are reinforced. Accordingly, the synthesized output voltage signal shows a dual-peak response characteristic, as shown by C in FIG. 4, thereby allowing improvement of S/N ratio and more reliable detection of knocking vibration. In this case, the resonant frequency of the vibrator is adjusted by the change of cantilever length.

Figure 5A:
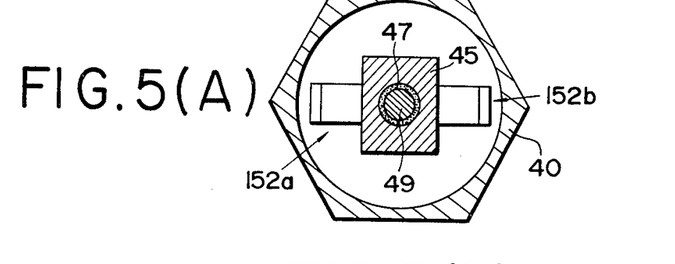
FIG. 5(A) is a cross-sectional view showing a second embodiment of a set of cantilever type vibrators arranged in axial relation to each other symmetric about the center and FIG. 5(B) is a vertical sectional view thereof.
Figure 5B:
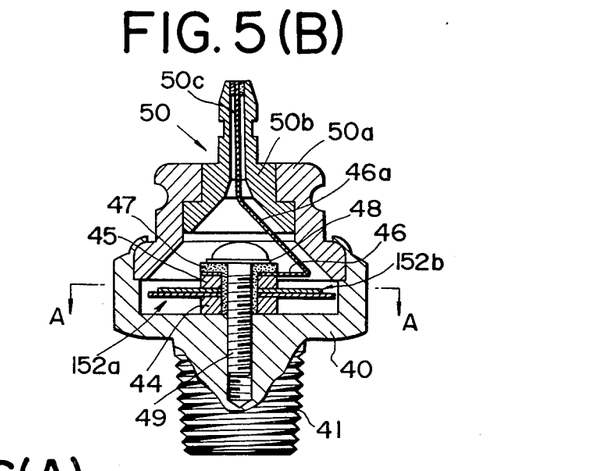

FIG. 5 shows a second embodiment of the present invention. In the figure, the numeral 40 is a cylindrical metal housing having an anchor bolt 41. At the center of the housing 40, two vibrator units 152a and 152b having two different resonant frequencies, respectively, are clamped between rectangular blocks 44 and 45 by a bolt 49 with an output conducting washer 46, an insulating sleeve 47, and a washer 48 arranged therebetween, respectively. On top of the housing 40, a housing cap unit 50 is fixed by bending inward the cylindrical housing end to form a flange portion. The housing cap unit 50 comprises an insulating portion 50a, and a metal terminal portion 50b having a hollow 50c therein. Within the hollow 50c of the terminal portion 50b, a lead portion 46a of the conducting washer 46 is housed; after the housing cap unit 50 is fixed to the housing body 40, the top of the hollow cavity 50c is sealed up by soldering, so that the end of the lead 46a is connected to the top of the terminal portion 50b.

Figure 6A:
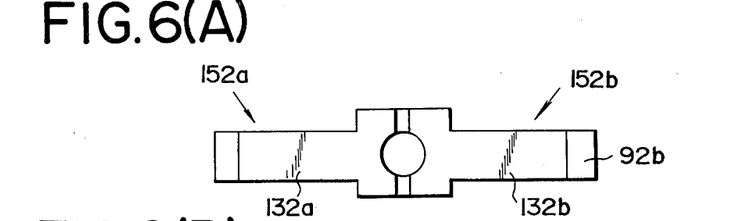
FIG. 6(A) is an expanded plan view showing the vibrators of FIG. 5.
Figure 6B:
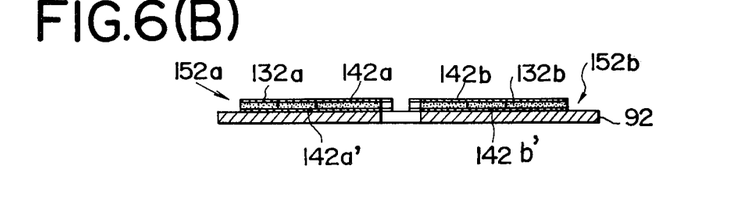
FIG. 6(B) is an expanded vertical sectional view thereof.

In this embodiment, the vibrator units 152a and 152b are positioned in axial relation to each other essentially symmetric about the center axis of said housing, as shown by FIGS. 6(A) and 6(B). In this case, two piezoelectric vibrator units 152a and 152b having electrodes 142a and 142a', and 142b and 142b' are fixed onto a metal plate 92.

The piezoelectric elements 132a and 132b of the vibrator units are fixed to a metal plate so that their polarization directions are opposite to each other, as shown by the arrow marks, with the result that the piezoelectric signals from the elements are synthesized in reverse polarity when deformed in the same direction. Accordingly, the sensor signal between the terminal 50b and the housing 40 provides a preferable sensor output characteristic as shown in FIG. 4, being the same as in the first embodiment.

Figure 7A:
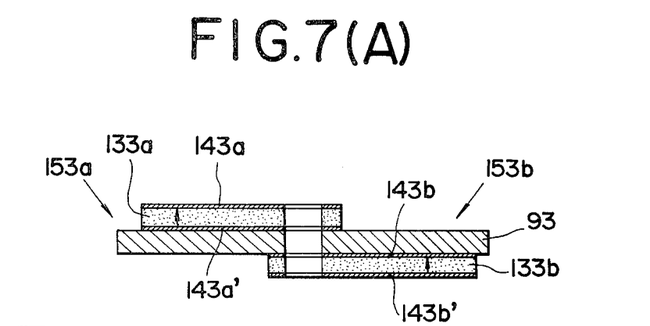
FIG. 7(A) is an expanded vertical sectional view showing a third embodiment of the vibrators used with the sensors of FIG. 5.

FIG. 7(A) shows a third embodiment of the present invention. In this embodiment, a first vibrator unit 153a is fixed onto the leftward top surface of a metal plate 93; a second vibrator unit 153b is fixed onto the rightward bottom surface of the metal plate 93, with the same dielectric polarization direction, as shown by the arrow marks in FIG. 7(A).

Figure 7B:
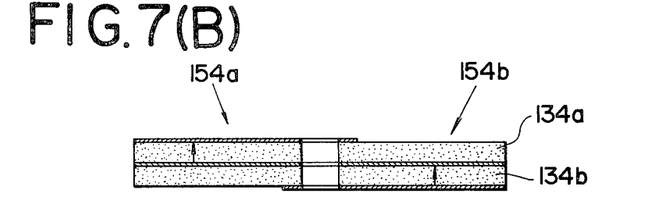
FIG. 7(B) is an expanded vertical sectional view showing a fourth embodiment of the vibrators used with the sensors of FIG. 5.

FIG. 7(B) shows a fourth embodiment. As depicted in the figure, it is possible to form the vibrators 154a and 154b by fixing a piezoelectric element 134a having no electrode on the rightward top side to another piezoelectric element 134b having no electrode on the leftward bottom side, without the use of a metal base plate.

Figure 8:
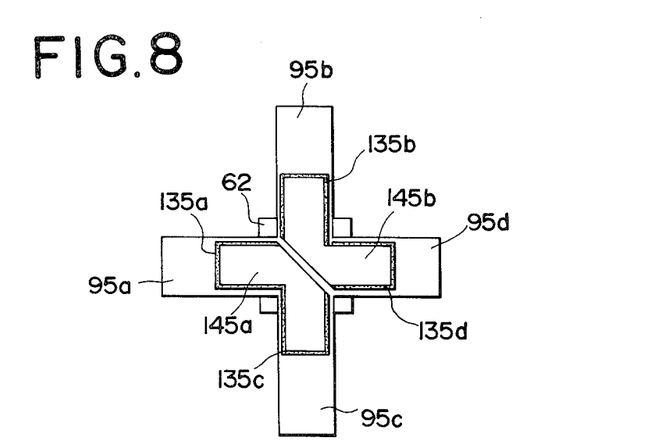
FIG. 8 is an expanded plan view showing a fifth embodiment of a set of cross-shaped cantilever type vibrators according to the present invention.

FIG. 8 shows the fifth embodiment of the present invention. In the figure, a cross-shaped piezoelectric vibration element 135 having four cantilevers is fixed onto a cross-shaped metal plate 95 substantially larger than the element 135. The resonant frequencies of the four cantilevers are designed to be higher in the order of 95a, 95b, 95c and 95d, that is, in the order of diagonal position. On the metal plate 95, the four cantilever type piezoelectric elements are divided into two groups: 135a and 135c, and 135b and 135d, in the form of a cross obliquely split into two portions, and the polarization directions of each group are reversed to each other. In the figure, the numerals 145a and 145b denote electrodes having opposite polarities, and numeral 62 denotes a rectangular support base.

Figure 9:
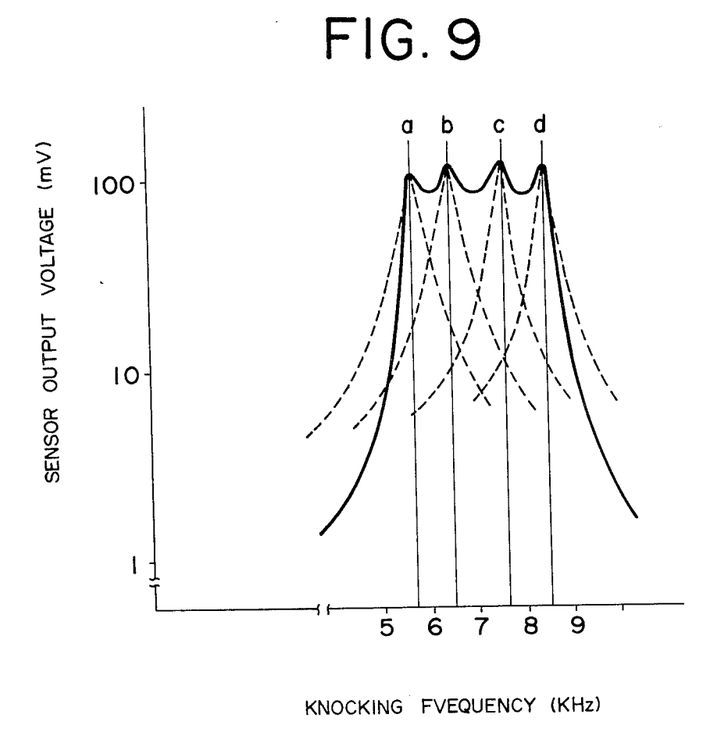
FIG. 9 is a response characteristic diagram of the vibrators shown in FIG. 8.

According to this embodiment, since the polarity of the piezoelectric elements 135a and 135c is opposite that of elements 135b and 135d, and the resonant frequencies of these elements are designed to be higher in the order of 95a, 95b, 95c and 95d, the whole piezoelectric voltage signal characteristic is represented by the characteristic curve shown in FIG. 9.

Figure 10A:
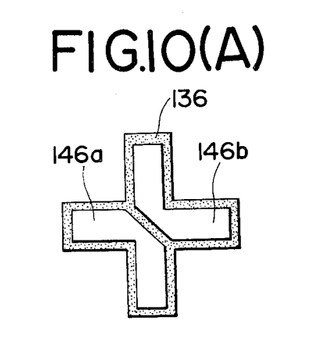
FIG. 10(A) is a top plan view showing a sixth embodiment of a set of cross-shaped cantilever type vibrators according to the present invention.
Figure 10B:
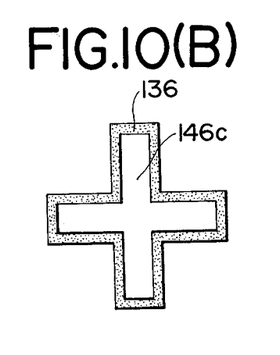
FIG. 10(B) is a bottom plan view thereof.
Figure 10C:
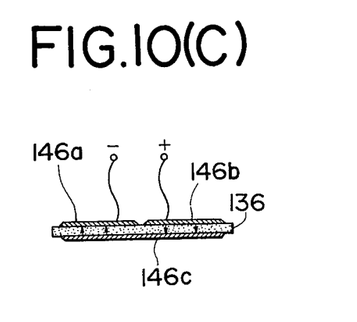
FIG. 10(C) is a vertical sectional view thereof.

FIG. 10 shows a sixth embodiment of the present invention. In this embodiment, on the surface of a cross shaped piezoelectric vibration element 136, two electrodes 146a and 146b are formed in the shape of a cross obliquely split into two portions, as shown in FIG. 10(A); on the back surface of the element 136, a single electrode 146c is formed, as shown in FIG. 10(B). The piezoelectric element 136 is then dielectrically polarized by using the two electrodes 146a and 146b, as shown in FIG. 10(C), under a high potential so that two different polarization directions can be obtained in the same piezoelectric element 136.

Figure 11:
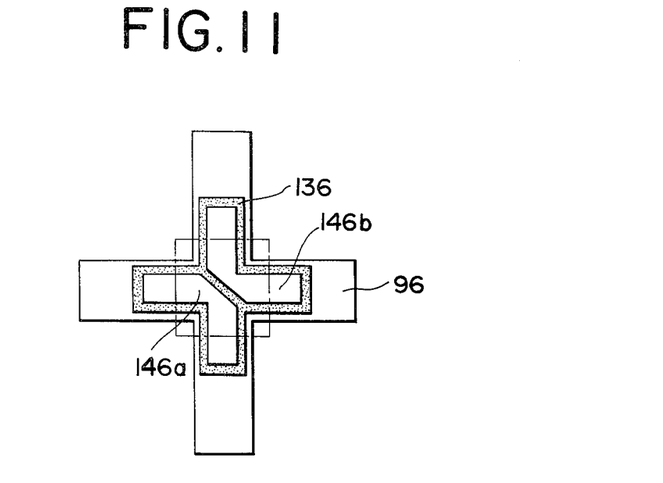
FIG. 11 is a top plan view showing the assembly of the sixth embodiment of FIG. 10.

FIG. 11 shows a state in which the four piezoelectric elements are fixed onto a metal plate 96.

Figure 12A:
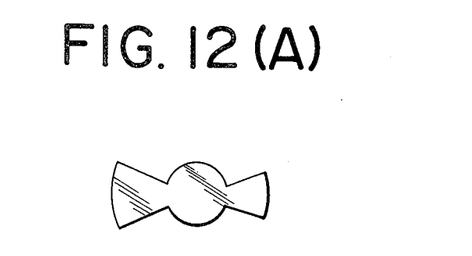
FIGS. 12(A) and (B) are plan views showing a seventh embodiment of a set of fan-shaped cantilever type vibrators according to the present invention.
Figure 12B:
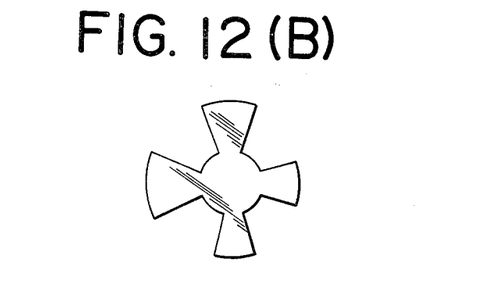

FIGS. 12(A) and 12(B) show a seventh embodiment of the present invention. In this embodiment, the metal plates are formed in the shape of a fan. Since the shape of a fan increases the equivalent mass, it is possible to shorten the length of the vibrators as compared with the cantilever type vibrator.

Figure 13:
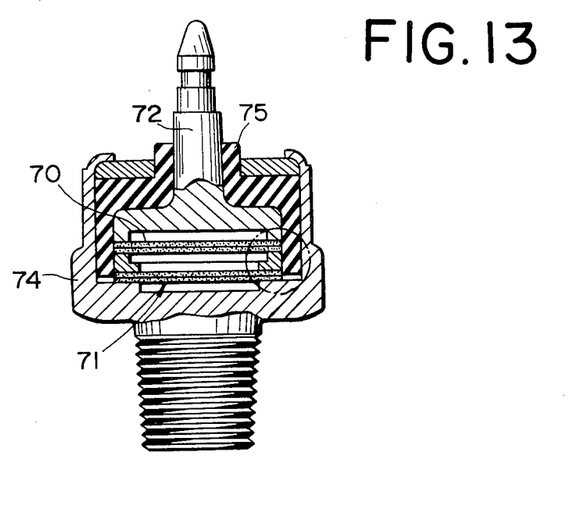
FIG. 13 is a vertical sectional view showing an eighth embodiment of a set of diaphragm-type vibrators arranged in parallel with a space therebetween.
Figure 13A:
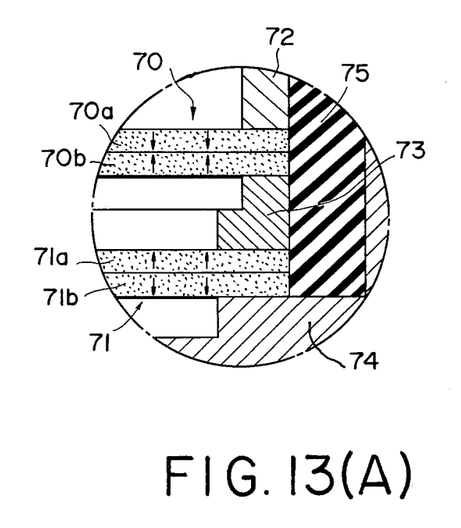
FIG. 13A is an enlarged view of the circled portion on FIG. 13.

FIG. 13 shows an eighth embodiment. In this embodiment, a pair of disk-shaped Bimorph cells 70 and 71 are positioned in parallel facing each other in a housing 74. The Bimorph cell 70 includes a piezoelectric element 70a and another piezoelectric element 70b, which are polarized in reverse directions facing each other, as shown by the arrows in the figure. In the same way, the Bimorph cell 71 includes a piezoelectric element 71a and another piezoelectric element 70b, which are polarized in reverse directions facing away from each other. The two Bimorph cells 70 and 71 are clamped at their peripheries to the housing 74 by a collar 73, a terminal 72, and an insulating member 75. In this embodiment, no metal plate is provided because the stiffness of the vibrators (Bimorph cells) is relatively large. Further, the respective electrodes are the same as in FIG. 7, but not shown.

The resonant frequencies of the cells are predetermined by changing the diameters of the cells. In this embodiment, it is of course possible to use a pair of Unimorph cells (having a single piezoelectric element) arranged to have opposite polarization directions.

Figure 14:
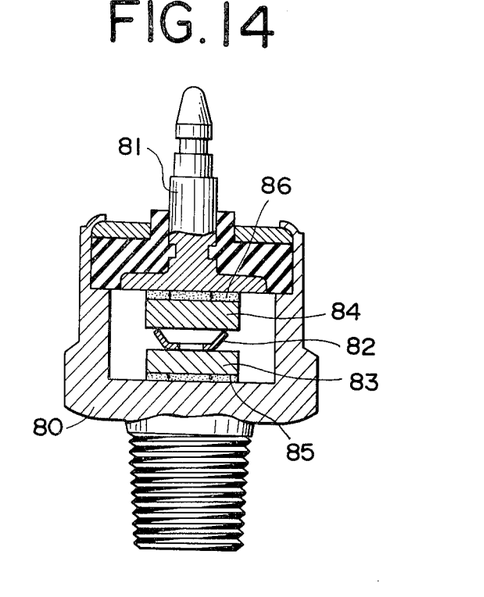
FIG. 14 is a vertical sectional view showing a ninth embodiment of a series mass-spring-mass linear motion type vibrators according to the present invention.
Figure 15:
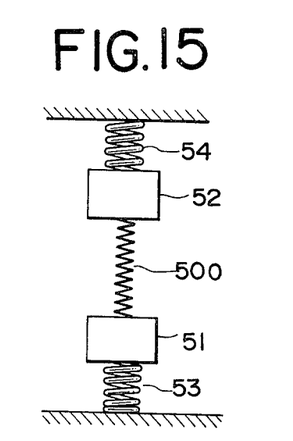
FIG. 15 is an equivalent diagram of the ninth embodiment shown in FIG. 14.

FIG. 14 shows a ninth embodiment and FIG. 15 shows the equivalent diagram of this embodiment. In this embodiment, a pair of weights 83 and 84 are mounted between a housing 80 and a terminal 81 with a dish-shaped spring 82 therebetween, and a pair of piezoelectric elements 85 and 86 having the same polarization direction are fixed between the weight 83 and the housing 80 and the weight 84 and the terminal 81. In FIG. 15, the equivalent diagram, spring 500 is the spring 82, springs 53 and 54 are the elements 85 and 86, and the masses 51 and 52 are the weights 83 and 84, forming a two-degree-of-freedom vibration system. The spring constant (stiffness) 500 of the dish-shaped spring 82 is very small as compared with the spring constants 53 and 54 of the element 85 and 86. It is possible to consider the spring 82 as a conductor. With this embodiment, it is possible to obtain the same effect as explained hereinabove. Further, in this embodiment, the respective resonant frequencies can be adjusted by changing the masses of the weights.

As described above, according to the present invention, since a plurality of piezoelectric vibration elements are so arranged that the piezoelectric voltage signals from the elements are synthesized in reverse polarity between two elements having two adjacent resonant frequencies when the elements are deformed in the same direction, if the knocking frequency (external force vibration) is between two adjacent resonant frequencies, the piezoelectric voltage signals are synthesized in the same polarity, because a first vibration element is 180 degrees out of phase with another vibration element. Therefore, it is possible to obtain a wide-band multi-peak vibration response characteristic and to improve the S/N ratio of a knocking sensor.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A vibration sensor which comprises:
   (a) a housing having a hollow cavity;
   (b) a plurality of piezoelectric vibration elements free to vibrate within the hollow cavity of said housing, the resonant frequencies of said vibration elements being selected to be relatively close to each other, said vibration elements being arranged to generate a piezoelectric sensor signal such that the respective piezoelectric voltages from said vibration elements are synthesized in the same polarity when engine knocking frequency lies between the two resonant frequencies of said vibration elements and are synthesized in the reverse polarity when engine knocking frequency lies below the lower resonant frequency or lies above the higher resonant frequency of said vibration elements; and
   (c) conducting means for conducting the piezoelectric signal in response to the vibration of said piezoelectric elements,
   whereby a multi-peak vibration response characteristic is obtained.

2. A vibration sensor as set forth in claim 1, wherein the number of said piezoelectric vibration elements is an even number.

3. A vibration sensor as set forth in claim 2, wherein the first ends of said piezoelectric vibration elements are fixed to said housing and the second ends thereof are free to vibrate within the hollow cavity in cantilever fashion.

4. A vibration sensor as set forth in claim 3, wherein said vibration elements are positioned in parallel relation to each other on the same side.

5. A vibration sensor as set forth in claim 3, wherein said vibration elements are positioned in axial relation to each other essentially symmetric about the center axis of said housing.

6. A vibration sensor as set forth in claim 3, wherein said vibration elements are positioned in cross relation to each other essentially symmetric about the center axis of said housing.

7. A vibration sensor as set forth in claim 3, wherein said vibration elements are fan-type cantilevers.

8. A vibration sensor as set forth in claim 3, 4, 5, 6 or 7, wherein the resonant frequencies of said vibration elements are predetermined by the change of cantilever length of said vibrators.

9. A vibration sensor as set forth in claim 2, wherein the peripheries of said piezoelectric vibration elements are fixed to said housing and the centers thereof are free to vibrate within the hollow cavity in diaphragm fashion.

10. A vibration sensor for detecting engine knocking vibrations which comprises:
    (a) a housing having a hollow cavity; and
    (b) a plurality of Bimorph cell type disk-shaped piezoelectric vibration elements free to vibrate within the hollow cavity of said housing, the resonant frequencies of said vibration elements being selected to be relatively close to each other, said vibration elements being arranged to generate a piezoelectric sensor signal such that the respective piezoelectric voltages from said vibration elements are synthesized in the same polarity when engine knocking frequency lies between the two resonant frequencies of said vibration elements and are synthesized in the reverse polarity when engine knocking frequency lies below the lower resonant frequency or lies above the higher resonant frequency of said vibration elements.

11. A vibration sensor for detecting engine vibrations as set forth in claim 10, wherein the resonant frequencies of said Bimorph cell type disk-shaped piezoelectric vibration elements are determined by the change of the diameter of said Bimorph cell.

12. A vibration sensor for detecting engine knocking vibrations which comprises:
    (a) a housing having a hollow cavity;
    (b) a plurality of masses;
    (c) a dish-shaped spring; and
    (d) a plurality of piezoelectric transducer elements free to vibrate within the hollow cavity of said housing, said transducer elements being clamped by said housing with said masses between said transducer elements and with said dish-shaped spring between said transducer elements and with said dish-shaped spring between said masses, the resonant frequencies of the series mass-spring-mass linear motion vibration system, in which said transducer elements serve only as springs, being selected to be relatively close to each other, said vibration system being arranged to generate a piezoelectric sensor signal such that the respective piezoelectric voltages from said transducer elements are synthesized in the same polarity when engine knocking frequency lies between the two resonant frequences of said vibration system and are synthesized in the reverse polarity when engine knocking frequency lies below the lower resonant frequency or lies above the higher resonant frequency of said vibration system.

13. A vibration sensor for detecting engine vibrations as set forth in claim 12, wherein the resonant frequencies of said series mass-spring-mass linear motion vibration system are determined by the change of mass of said vibration system.

* * * * *